3,190,720
PROCESS FOR THE SELECTIVE RECOVERY OF VANADIUM OXIDE FROM ALKALINE LIQUORS

Mayer B. Goren, Golden, Colo., assignor to Kerr-McGee Oil Industries, Inc., a corporation of Delaware
No Drawing. Application Feb. 28, 1961, Ser. No. 92,138, which is a continuation of application Ser. No. 662,001, May 28, 1957. Divided and this application Nov. 22, 1963, Ser. No. 325,767
12 Claims. (Cl. 23—23)

This application is a division of my copending application Serial No. 92,138, filed February 28, 1961 and now abandoned. Application Serial No. 92,138, in turn, is a continuation of my application Serial No. 662,001, filed May 28, 1957, now abandoned.

The present invention relates to the recovery of vanadium from its solutions and more particularly to an improved process for the precipitation of a high purity vanadium oxide product from alkaline, neutral or acid liquors containing vanadium.

The majority of vanadium liquors rich enough in $V_2O_5$ content and low enough in certain impurities such as iron to yield a specification grade vanadium oxide product upon precipitation are obtained by the salt roast-water (or soda ash) leach process, or by a soda ash leach of non-roasted ores. The resulting leach liquors are essentially neutral or alkaline vanadate solutions wherein the vanadium may be present as $NaVO_3$, $Na_3VO_4$ or similar species or mixtures. A fraction of the vanadium content, usually small, may be present in a lower valence state and most precipitation processes for such liquors incorporate an oxidation step. Still other vanadium pregnant leach liquors are derived from direct acid leaching of the raw or roasted ores, or from acid leaching of the tailings from a carbonate of salt-roast water-leach process. Such acidic leach liquors, in general, are low in vanadium content and most often contain sufficient dissolved impurities such as iron and aluminum that a direct precipitation of specification grade vanadium oxide product is impractical due to extremely low yield under the requisite conditions of precipitation. Thus, it is necessary to modify the conditions of precipitation and to sacrifice purity of the precipitated product for the sake of more complete recovery of the vanadium content. The highly impure vanadium oxide product derivable from these acidic liquors after oxidation at proper pH levels and precipitation contains large amounts of iron vanadate, calcium vanadate or similar impurities and requires extensive upgrading before the product will meet the rigid specifications for specification grade vanadium oxide. One method of upgrading involves leaching of the impure product with alkali or soda ash, separating the resulting vanadium rich alkaline leach liquor and then precipitating vanadium content by a conventional precipitation process suitable for processing vanadium rich alkaline liquors.

The above described vanadium rich neutral or alkaline leach liquors may be further processed in accordance with the "red cake" precipitation process to thereby obtain a commercially valuable vanadium oxide product. In practice, a vanadium-rich alkaline or neutral liquor containing 30 to 60 grams per liter of $V_2O_5$ is treated with sulfuric acid in order to largely neutralize the various species of alkali vanadate present. It has been considered desirable in the prior art practice that the liquor be at or near the boiling point at the time the requisite amount of acid is added to initiate precipitation. To this end, the liquors are heated either before or during the addition of sulfuric acid. Under the proper conditions at the elevated temperature involved when the level of acidity has reached a pH of about 3.2–3.5 as denoted by indicator paper or by a temperature-compensated pH meter initial precipitation of "red cake" is essentially spontaneous. The tank contents are then maintained at an elevated temperature and since the pH tends to slowly increase, additional increments of sulfuric acid are added periodically as the precipitation proceeds in order to maintain the pH at approximately 3.2–3.5. Under ideal conditions, precipitation is completed within a period of about an hour. The product is known in the art as "red cake" and consists of reddish brown beads, the composition of which corresponds more or less to that of sodium dihydrodeutero hexavanadate ($Na_2H_2V_6O_{17}$). The red cake product thus obtained is contaminated by occluded salts such as sodium salts originally present in the leach liquor which are somewhat amenable to a washing treatment. However, the high sodium content of the product renders it undesirable for certain applications even after a thorough washing and it is necessary to resort to an "ion exchange" wash with ammonium sulphate solution for the purpose of replacing the sodium ions by ammonium ions. The latter are then volatilized out of the product in the subsequent fusion process which ordinarily follows the ammonium sulphate wash leaving the somewhat purer vanadium "black oxide" of commerce.

The above described red cake precipitation process is subject to many variables which adversely affect the course of precipitation. As a result, red cake precipitation is more of an art than a science. For example, a synthetic pure $NaVO_3$ solution containing 30 grams per liter of $V_2O_5$ may be almost completely inhibited toward precipitation of red cake even on prolonged heating. However, if 50–60 grams per liter of sodium chloride is first added to this same solution, then rapid and complete red cake precipitation may be effected. A tendency toward inhibited red cake precipitation is particularly true of low-grade liquors containing about 10 grams per liter of $V_2O_5$, although this behavior is not limited to such low-grade liquors. Instead of yielding a precipitate of red cake in the form of the usual beads, only a trace of either flaky or filamentous material may be formed and the remainder of the vanadium remains in solution. However, in the instance of low-grade liquors, the practice of adding salts in quantity may or may not prove to be beneficial, in which event seeding of the precipitation liquors with large quantities of previously precipitated red cake may be of aid. In any event, precipitation of low-grade liquors may require six to eight hours or more of heating and processing during the precipitation step.

Small amounts of phosphate present in liquors processed by the red cake precipitation process are generally highly deleterious. Even small quantities of phosphate in the head liquors may markedly affect the rate and completeness of the precipitation and the product rather than being obtained as readily filterable beads, may be obtained in the form of an unfilterable slimy mud. The rate of precipitation is drastically lowered and even at the end of many hours, the precipitation may be far from complete. Salt addition can be beneficial in phosphate containing liquors although considerably less so than in phosphate-free liquors. Even so, a phosphate concentration equivalent to 1 gram per liter $P_2O_5$ in a vanadium liquor assaying about 30 grams per liter $V_2O_5$ will largely inhibit red cake precipitation. In addition, the phosphate is incorporated in the end product and unless the $V_2O_5$ to $P_2O_5$ ratio in the head liquor exceeds about 100:1, the final red cake product contains excessive phosphorus and will not meet commercial specifications.

The nature of the precipitated product which is obtained in red cake precipitation is of greatest practical importance. However, for reasons sometimes wholly obscure instead of the readily filterable and easily washed beads which are obtained under ideal conditions a red cake precipitation may yield a slimy product, or a filamentous very flocculent precipitate, or an almost colloidal $V_2O_5$ product commonly referred to as "paint" in the industry. Such precipitated products are almost impossible to filter and due to their relatively low solids content and large surface area, they cannot be effectively washed free of occluded salts and thus the final product will not meet commercial specifications.

Still another additional limitation of the red cake precipitation process is a tendency toward a massive progressive build-up during the course of several precipitations of a solid, smooth, heavy layer of precipitated red cake on the walls of the precipitation vessel and the agitator used therein. This gradual build-up of red cake eventually necessitates a periodic dissolution process which involves long contact with hot soda ash or caustic solution to dissolve the deposited red cake, which is then reprecipitated in the usual manner. The dissolution process is costly in both time and process chemicals and thus it is to be avoided wherever possible.

Two classes of high grade vanadium pregnant liquors suitable as feed liquors for the precipitation process of the present invention are:

(1) Acid liquors having a pH of about 2.0 and lower, in general; and containing reduced vanadium (generally quadrivalent vanadium), and (2) Nearly neutral to alkaline liquors having a pH of about 5 and higher and largely containing vanadium in the quinquevalent state, generally as vanadate. Such liquors may be referred to herein as "alkaline" liquors.

The acid liquors containing reduced vanadium are derivable by a variety of processes. For example, the elution of vanadium-loaded anion exchange resins with an aqueous sulphurous acid solution affords an acidic, reduced vanadium pregnant liquor. Alternately, vanadium may be solvent extracted from dilute acid leach liquors by contacting the same with di-2-ethyl hexyl phosphoric acid or other phosphoric acid esters in an organic diluent such as kerosene. The vanadium loaded organic phase is then stripped of its vanadium content by contacting the organic phase with a somewhat more concentrated aqueous mineral acid. In this step, the quadrivalent vanadium is transferred from the organic phase to the acid stripping solution to thereby afford a relatively concentrated vanadium pregnant liquor of relatively high acidity and in which the vanadium is present largely in the quadrivalent state. Vanadium pregnant liquors of the second classification mentioned above (i.e., quinquevalent vanadium solutions having a pH of about five or higher) are derivable by the familiar salt roast-water leaching of vanadium ores, by carbonate leaching of vanadium ores (either roasted or uncalcined), or by alkaline or soda ash leaching of crude vanadium concentrate containing at least a part of the vanadium in the quinquevalent state.

When the above described two classes of liquors, either acid or alkaline, proceed to precipitation for the preparation of high grade vanadium products by either conventional means or by the process of the present invention, they are rich in contained vanadium as compared with other constitutents which they may contain as impurities. Among these are phosphate as an anion impurity; and iron, aluminum and similar multivalent cations, all of which are, in general, present only as minor constituents. It is understood that any substantial amount of uranium present in the original leach liquor is preferably removed by conventional procedures prior to precipitation of a vanadium oxide product in accordance with the present invention. In the practice of this invention, both of the above mentioned types of liquors can be processed.

In this particular art, the vanadium and phosphorus contents of vanadium pregnant liquors or vanadium containing products are commonly calculated and referred to as grams per liter or percent by weight $V_2O_5$ and $P_2O_5$, respectively. However, it is understood that such liquors or products do not necessarily contain their vanadium and phosphorus content as $V_2O_5$ and $P_2O_5$, as the foregoing terms are used merely for convenience. Using such terminology, the commercial specifications (by weight) for a commercially acceptable vanadium oxide product are a $V_2O_5$ content of at least 86%, a $P_2O_5$ content of not more than 0.115%, and a $SO_4$— content of not more than 0.45%. These specifications are very rigid and if a given vanadium oxide product does not meet each and every specification above mentioned, then the vanadium oxide product is not commercially acceptable and is useless from the commercial standpoint unless further purified by involved and costly procedures. Thus, it will be appreciated that small differences in the $V_2O_5$, $P_2O_5$ and $SO_4$— content of the vanadium oxide product are of great importance in this art.

It is an object of the present invention to provide a new and improved process for the recovery of vanadium from vanadium bearing liquors as a readily filterable precipitate which meets commercial specifications without the necessity for further processing.

It is a further object of the present invention to provide a new and improved process for the precipitation from vanadium pregnant liquors containing relatively large quantities of impurities of a vanadium oxide product which is of specification grade.

It is still a further object of the present invention to provide a new and improved process for the processing of both acid-reduced and alkaline-oxidized vanadium pregnant liquors to produce a high grade commercially acceptable vanadium oxide product without further purification.

It is still a further object of the present invention to provide a new and improved process for the precipitation of a commercially acceptable vanadium oxide product, the process being more easily controlled, and essentially independent of the common operating variables which adversely affect red cake precipitation.

Still other objects of the present invention and the advantages thereof will be apparent from the following detailed discussion and the examples.

I have discovered that the vanadium content of a vanadium pregnant liquor can be precipitated rapidly, efficiently, and in a manner which minimizes the effects of phosphate or other variables on the nature, grade, and ease of precipitation of the vanadium oxide product. In accordance with the present invention, a vanadium oxide product is precipitated from a vanadium pregnant liquor as a readily filterable precipitate while maintaining during the precipitation thereof and in the absence of an induction period, the pH of the liquor at a value not greater than about 1.7 and sufficiently low as to precipitate a specification grade product, substantially all of the vanadium content of the liquor in the quinquevalent state and the temperature of the liquor at an elevated temperature of at least 75° C. When further reference is made herein to the pH being at a value not greater than 1.7, it is understood that the pH is adjusted to a value not greater than 1.7 and sufficiently low as to precipitate a specification grade product in all instances.

It will be apparent to those skilled in the art that the manner in which the vanadium pregnant liquor is treated in order to arrive at the necessary conditions for precipitation of a vanadium oxide product in accordance with the present invention will vary depending upon the origin or nature of the liquor to be precipitated. For example, when the vanadium pregnant liquor to be treated is an oxidized alkaline vanadium pregnant liquor such as previously described, the first step in the process of the present invention may comprises heating the liquor to an elevated temperature in the neighborhood of the boiling point, such as about 85° C. The liquor may then be acidified by the addition of mineral acid until a pH of the order of 3½ to 3 is reached. This preliminary acidification may be carried out slowly if the vanadium solution charged does not readily afford a red cake precipitate; otherwise, the adjustment in pH should be rapid. At this point, ordinarily the precipitation of vanadium red cake will take place, but this is not allowed to occur in a significant amount. Instead, the precipitation of red cake is immediately inhibited, i.e., in the absence of an induction period by the rapid addition of a sufficient quantity of mineral acid to rapidly drop the pH through the region of about 3.0 to a pH not greater than 1.7. As a result of the rapid drop in pH, a very rapid precipitation of the vanadium content occurs with the product being in the form of a dense, dark brown to reddish brown grainy material. The resulting precipitated vanadium oxide product is not red cake and while the chemical nature thereof is not fully understood at the present time, it is believed to comprise largely hydrated vanadium oxide. In any event, the vanadium oxide product of the present invention contains much less sodium than the red cake of commerce and a $V_2O_5$ content usually in excess of 80%. A short retention time of the precipitating liquor at elevated temperature and at a pH not greater than 1.7 while maintaining the vanadium content of the solution in the quinquevalent state serves to deplete rapidly the vanadium content of the original pregnant solution. It is advantageous that the precipitating solution and its solids contents be agitated during the precipitation step at a speed such that the dense precipitated product does not settle to the bottom of the containing vessel, with the heating and agitation being continued until the solution is depleted to the desired level. Generally the solution is depleted of vanadium to a desired level after the expiration of a period of time of the order of about 30–45 minutes, or somewhat longer in some instances. In instances where the alkaline oxidized liquor to be processed also contains vanadium in the quadrivalent state, or where quadrivalent vanadium is present in substantial amount in the precipitating liquor, it is necessary that an oxidant be added to bring the E.M.F. to a level sufficient to oxidize and maintain substantially all of the vanadium present in the solution in the quinquevalent state. Many oxidants are suitable for this purpose, among which may be mentioned sodium chlorate, sodium peroxide, hydrogen peroxide, etc. The addition of sufficient oxidant to provide an E.M.F. of about −700 mv. has been found to be sufficient to achieve the purpose of oxidant addition and to give very satisfactory results. The oxidation state of the system is defined by reference to the E.M.F. established between a platinum electrode and a saturated calomel electrode immersed in the precipitating liquor (in the liquor to be precipitated). The pH of the precipitating liquor (or the liquor to be precipitated) is measured at a temperature of 15–35° C., or the pH reading is adjusted to such temperature. This is necessary since many vanadium solutions exhibit considerable change in the pH with temperature, the pH showing an apparent rise with increase in temperature. Inasmuch as the pH of the precipitating solution is critical over a relatively narrow pH range, the necessity for such pH adjustment will be apparent.

In instances where it is desirable to process an alkaline oxidized liquor containing at least 10 grams per liter of $V_2O_5$, a suitable process for achieving the precipitation of a commercially acceptable vanadium oxide product in accordance with the present invention involves heating the solution to a temperature near the boiling point, e.g., 85° C.–95° C. The pH is then adjusted with sulphuric acid, either concentrated or diluted to 50% strength, to a point where Congo red is beginning to show a blue color. The pH at this point will be in the neighborhood of about 3½ to 3. Then, in the absence of an induction period, the pH of the liquor is then adjusted very rapidly by the rapid addition of enough sulphuric acid to drop the pH to a value not greater than 1.7. The sulphuric acid added during the second acidification step may be a 50% solution. The quantity of sulphuric acid required to drop the pH to the desired level may be determined beforehand on a small sample of the pregnant liquor, thereby avoiding the necessity of more or less continuously checking the pH from time to time. If the pH has a tendency to drift outside of the desired limits, adjustments may be made from time to time by the simple addition of either acid or base such as sodium hydroxide as required. In addition, if the oxidation potential of the precipitating liquor as indicated by an E.M.F meter is such that small amounts of vanadium may be present in quadrivalent state, then sufficient oxidant such as a sodium chlorate solution may be added in quantities sufficient to maintain substantially all of the vanadium content of the liquor in the quinquevalent state.

When processing an alkaline oxidized liquor, following the above described practice of a two-stage adjustment of pH, it is immaterial whether the heating of the liquor takes place before or after the initial adjustment of pH provided than an appreciable induction period is not involved at elevated temperature when the liquor has a pH in the neighborhood of about 3½, i.e., a pH sufficiently low to result in the precipitation of red cake at elevated temperature. Thus, it may be possible to heat the liquor to approximately 85° C. and achieve initial acidification to a pH of approximately 3.5 by the addition of concentrated sulfuric acid. Alternatively, the sulphuric acid may be added at a somewhat lower temperature which may be advantageous in minimizing spattering of the concentrated acid due to the heat of dilution and neutralization. Then, when the liquor has been neutralized to a pH of approximately 3½, the liquor may be quickly brought to a temperature near the boiling point and additional sulphuric acid added in quantities sufficient to provide a pH of not greater than 1.7. Generally, the quantity of sulphuric acid required to lower the pH from the Congo red point down to the desired level is about 0.25 to 1.0 pound of sulphuric acid for each pound of vanadium contained in the vanadium pregnant liquor.

When precipitating a vanadium oxide product in accordance with the present invention from reduced acidic liquors, it is possible to proceed by a number of alternative routes. For example, the reduced liquor may be heated to a temperature near the boiling point, such as 85–90° C., and then oxidized by the addition of the requisite amount of oxidant to oxidize and maintain substantially all of the vanadium content of the liquor in the quinquevalent state, as previously described for oxidized alkaline liquors. Then, the pH of the oxidized liquor may be rapidly adjusted to a value not greater than 1.7, as previously described for oxidized alkaline liquors. When this is done, a product resembling that obtained in the previously described precipitation of an oxidized alkaline liquor is rapidly precipitated. Alternatively, the reduced acid liquor to be precipitated may be adjusted to a desired pH at low temperature, if necessary, it being borne in mind that the pH of the solution will undergo a change as the oxidation of the reduced vanadium and the precipitation of vanadium proceeds due to the formation of additional acid as a consequence of the reactions which are involved. As a result, the pH of the liquor will fall considerably during the course of oxidation-precipitation and the pH may be adjusted to a lower level in this manner if desired. However, additional adjustments of pH may be made by addition of acid or base as needed if the pH drifts from desired limits. The solution may then be heated to an elevated temperature approaching the boiling point and oxidant added rapidly in order to oxidize the reduced vanadium to the quinquevalent state in a minimum period of time. Again, within a very short period of time and often almost immediately, precipitation of a grainy, red-brown oxide product ensues and if the solution is agitated and retained under the described conditions for a precipitating alkaline liquor, depletion of vanadium to satisfactory levels occurs rapidly. For example, usually 30 to 45 minutes are sufficient although the solution may be held under these conditions for a longer period of time if desired.

The vanadium content of the head liquor should contain at least 10 grams of $V_2O_5$ per liter and preferably 20 to 60 grams of $V_2O_5$ per liter. In addition, the ratio of $V_2O_5$ to $P_2O_5$ is of importance since, in some instances, a specification grade product may not be obtained if the $V_2O_5$ to $P_2O_5$ ratio is below about 15:1 because of excessive amounts of $P_2O_5$ in the final product. Preferably, the $V_2O_5$ to $P_2O_5$ ratio should be at least 30:1, with even better results being obtained with $V_2O_5$ to $P_2O_5$ ratios above 100:1. There is no upper limit on the $V_2O_5$ to $P_2O_5$ ratio as any suitable ratio above 15:1 is generally satisfactory, but better results are obtained with higher ratios of $V_2O_5$ to $P_2O_5$.

The temperature of the liquor during precipitation must be sufficiently elevated to effect rapid precipitation and preferably should be near the boiling point. Temperatures lower than about 75° C. are generally unsatisfactory due to the low rate of precipitation, while a temperature between about 75° C. and the boiling point of the liquor gives good results in most instances. Even better results are obtained when the liquor is maintained at a temperature between about 85° C. and the boiling point.

It has been found that the amount of phosphate which is present in the vanadium oxide product is a function of the degree of contamination of the head liquor with this anion, but satisfactory phosphate rejection is achieved when the precipitation is carried out in accordance with the process of the present invention. For relatively low phosphate liquors, e.g., liquors having a $V_2O_5$ to $P_2O_5$ ratio of at least about 100:1, the most satisfactory results will be achieved if the pH is maintained at a value not greater than 1.5 and preferably between about 0.5 and 1.5; for liquors having a $V_2O_5$ to $P_2O_5$ ratio between about 15:1 and 100:1, the most satisfactory results are achieved if the pH is maintained at a value not greater than 1 and preferably between 0.5 and 1.0.

As the pH of the precipitating liquor is lowered to levels approaching 0.5, it has been found that the barrens contain progressively more unprecipitated vanadium. This is undesirable from the standpoint that excessive reprocessing of the barrens may be required if the level of depletion does not reach desired values. Secondly, the lower pH limits are reached at the expense of considerable additional acid and thus, from the standpoint of economics, it is preferable to operate within the higher practical pH limits. On the other hand, the lower pH levels are of advantage in that precipitation proceeds at a much more rapid rate and the nature of the precipitate is more granular or grainy in nature, and is thus easier to filter, settle and wash. Lower pH levels are also of importance due to the product precipitated at lower pH levels tending to be purer than that precipitated at higher pH levels. It will be recognized that this is of extreme importance in instances where the original vanadium pregnant liquor contains appreciable quantities of contaminates and particularly phosphate. It has been found in practice that when the $V_2O_5$ to $P_2O_5$ ratio is less than about 100:1, that ordinary red cake precipitation leads to a product contaminated with an excessive amount of phosphate which will not meet commercial specifications. However, under the conditions of the present invention it is possible to precipitate solutions wherein the $V_2O_5$ to $P_2O_5$ ratio may be as unfavorable as 30:1, and in most instances as low as 15:1, with the grade of product still being sufficiently high to meet commercial specifications.

The upper pH limit of 1.7 is to an extent defined by the character of the precipitation and the physical nature of the precipitated vanadium product. As the pH rises to a value in excess of 1.7, the rate of precipitation of product begins to drop off and the physical form of the precipitate changes to a certain extent. For example, the product begins to take on a filamentous or sometimes "paint-like" character, with the attendant danger that the precipitated product will become physically degraded into a non-filterable, non-washable flocculent form, in addition to being highly impure.

The process of the present invention is particularly effective in processing certain acidic reduced vanadium pregnant liquors containing contaminants such as iron. For example, iron contamination to the extent of 10–15% of contained $V_2O_5$ may be present in such a liquor and yet the liquor may be satisfactorily precipitated to produce a specification grade product by the process disclosed herein when operating at pH levels of about 0.5 to 1.0. This is remarkable in view of the fact that a specification grade product may not be obtained by the red cake precipitation process when such levels of iron contamination are present.

It has further been found that the rate of precipitation of a vanadium oxide product in accordance with the process of the invention is not appreciably affected by the presence or absence of extraneous salts such as are necessary for satisfactory red cake precipitation. In addition, products only slightly contaminated with sodium or potassium are obtained even from liquors which are rich in sodium or potassium ion. Thus, the lower sodium content in the vanadium oxide product produced in accordance with the present invention is highly desirable and results in the production of a more valuable vanadium product.

Still another advantage of the process of the present invention lies in the rate of precipitation from low-grade vanadium pregnant liquors such as liquors containing on the order of about 15 grams per liter of $V_2O_5$. When precipitating such liquors, the rate of precipitation is still very rapid and long retention of liquors for the purpose of depletion of the vanadium content to a desired level, as well as the massive seeding, often practiced in red cake precipitation are not necessary. An additional advantage is that the nature of the vanadium oxide product is such that there is little tendency to adhere and build up on the walls of the precipitation vessel or upon the agitator as is true of red cake precipitation.

The foregoing detailed description and the following specific examples are for the purpose of illustration only and are not intended as limiting to the spirit or scope of the appended claims.

EXAMPLE I

This example illustrates the precipitation of a vanadium oxide product in accordance with the invention from alkaline oxidized vanadium liquors.

A synthetic sodium vanadate solution was prepared by dissolving commercial red cake in a slight excess of sodium hydroxide in the presence of sufficient hydrogen peroxide to reoxidize to the quinquevalent state any vanadium which had been reduced in processing. A stock solution was prepared containing 106 g./liter $V_2O_5$ with a sodium content of 20 g./liter. This stock solution was diluted to give vanadium liquors of the desired concentration, and was processed as such or after the addition of one or more extraneous materials which ordinarily have some effect on the precipitation of vanadium.

*A. Processing of uncontaminated vanadium liquors.*— By dilution, liquors containing 15, 40 and 65 g. of $V_2O_5$ per liter were prepared. Three aliquots of each of the foregoing three liquors were selected and treated as follows:

Each aliquot of liquor was agitated and heated to 80° C. at which point sulfuric acid (½ g. $H_2SO_4$ per ml.) was added as rapidly as convenient until Congo red paper dipped into the solution gave a color ranging from brownish-blue to blue (the pH at this point was 3.3). Varying amounts of sulfuric acid (diluted to a concentration of 1.0 g. $H_2SO_4$ per ml.) were then added over a period of about four minutes or less, in order to drop the pH rapidly, the quantities ranging from 0.25 to 1.0 g. $H_2SO_4$ per gram of contained $V_2O_5$. The course of precipitation was carefully observed and recorded. Small amounts of sodium chlorate were added, as needed, to maintain the E.M.F. in the region of −700 mv. (Pt vs. saturated calomel). Heating was continued during the total few minutes of reagent addition so that by the time all of the acid had been added, the liquor was essentially at the boiling point.

After agitating and holding the liquor at or near the boiling point for the desired period of time, the precipitated vanadium oxide product was filtered and washed. The various barrens solutions and the products were assayed and the pH of the former measured at 20–35° C. and recorded. The data thus obtained illustrate the utility of the empirical guide of adding between about 0.25–1.0 g. $H_2SO_4$ per gram total contained $V_2O_5$ after first adjusting the acidity to the Congo red point. The results are tabulated below in Table I for each aliquot of liquor.

From the results of this example, it is readily seen that a high grade $V_2O_5$ product is obtained in satisfactory yield from a wide variety (as regards concentration) of alkaline (or neutral) oxidized vanadium liquors. For the lower grade liquors, addition of 0.25 gram $H_2SO_4$ per gram $V_2O_5$ charged to precipitation is not quite sufficient to lower the pH to about 1.5; but, for the higher grade liquors, this amount of acid is about sufficient. The filamentous nature of the product prepared at the higher pH levels (lower acid dosages) is somewhat deleterious to the filtration properties and as a result it is of advantage to work in the pH region about 1.5 or somewhat lower. It may be noted that the products of Runs 2, 5 and 7, which were precipitated very close to pH 1.5, are of satisfactory graininess, while products 1 and 4 are somewhat filamentous. Further, it is apparent that for higher grade liquors it is not necessary to treat at the higher acid levels (1 g. $H_2SO_4$ per gram $V_2O_5$ charged), but rather it is beneficial to operate in the middle range of dosage (0.5–0.75 g. $H_2SO_4$ per gram $V_2O_5$ charged).

EXAMPLE II

The following series of three precipitations was carried out to demonstrate the relations between pH of precipitation and sodium content of the product. A liquor was used which assayed 40 g. $V_2O_5$/liter and to which excess sodium in the amount of 40 g. NaCl per liter was added so that the total sodium concentration (expressed as NaCl) was about 55 g./liter. The liquor was heated to 80° C., acidified to congo red with sulfuric acid as in Example I, and chlorate added as necessary as in Example I. Additional sulfuric acid (from 0.25 to 1.0 g. $H_2SO_4$ per gram $V_2O_5$ charged) was then added within a short time in order to drop the pH rapidly. Again, heating of the liquor was continued throughout the reagent addition so that the solution was essentially at the boiling point when the reagent addition was completed.

The three portions of liquor were maintained at the boiling point for one hour, and the products collected and washed. The results are tabulated below in Table II.

Table II

| Run No. | Excess acid added (g. $H_2SO_4$/g. $V_2O_5$ charged) | Barrens | | Product | | |
|---|---|---|---|---|---|---|
| | | pH | Assay ($V_2O_5$), g./l. | Description | Percent $V_2O_5$ | Percent Na |
| 1 | 0.25 | 1.35 | 0.59 | Beads to filamentous. | 91.4 | 4.0 |
| 2 | 0.50 | 0.91 | 1.10 | Grainy | 93.0 | 3.6 |
| 3 | 1.0 | 0.52 | 3.31 | ___do___ | 93.6 | 3.4 |

From these results it may be seen that in the presence of considerable amounts of sodium, the pH levels achieved are somewhat lower at equivalent doses of acid than they are for solutions containing lesser quantities of extraneous sodium salts. Again dosage with 0.25 g. $H_2SO_4$ per gram contained $V_2O_5$ gives borderline results as regards the physical nature of the product. As the acid dosage increases, the grade of the product improves and the amount of sodium with which the product is contaminated decreases.

EXAMPLE III

The following series of four precipitations illustrates the deleterious effects of phosphate on normal red cake precipitation and confirms that at levels of phosphate content which are intolerable in red cake precipitation, the process herein disclosed is as useful as with uncontaminated liquors.

The head liquor assayed 30 g. $V_2O_5$/liter and contained sodium equivalent to 45 g. NaCl per liter. Red cake precipitation from such a liquor is facile and proceeds at a good rate to give an excellent product.

Aliquots of this liquor were contaminated by the addition of $KH_2PO_4$ in amounts designed to give very unfavorable $V_2O_5$:$P_2O_5$ ratios and vanadium was then precipitated by the methods described below. The barrens and products were assayed with the results shown in Table III. Each example is discussed separately, as follows:

(a) The head liquor was contaminated with phosphate to 1 g. $P_2O_5$ per liter to give a solution with a $V_2O_5$/$P_2O_5$ ratio of 30:1. The solution was heated near the boiling point, excess chlorate was added and the solution was acidified with $H_2SO_4$ to a pH of 3.2. In a similar liquor, not contaminated with phosphate, these conditions will effect rapid and excellent red cake precipitations. However, this phosphate-contaminated liquor merely became deep red in color, almost opaque, and only a small amount of red cake was deposited during a four-hour digestion period. Most of the product deposited on the walls of the reaction vessel. The small amount of red cake precipitate was filtered and washed.

Table I

| Run No. | Head liquor Assay (g. $V_2O_5$/liter) | Excess $H_2SO_4$ added (g./g. $V_2O_5$) | Start of precipitation | Total digestion period, min. | Barrens | | Percent precipitation | Product dried at 150° C. | |
|---|---|---|---|---|---|---|---|---|---|
| | | | | | pH | Assay (g. $V_2O_5$/liter) | | Description | Assay, percent $V_2O_5$ |
| 1 | 15 | 0.25 | Slow | 60 | 1.75 | 0.39 | 97.4 | Beady to filamentous. | 92.2 |
| 2 | 15 | 0.50 | Rapid (4 min. after final acidification). | 40 | 1.35 | 0.48 | 96.8 | Brown, grainy | 93.6 |
| 3 | 15 | 1.0 | Immediately after final acidification. | 41 | 0.90 | 1.48 | 91.0 | Red brown, grainy. | 91.7 |
| 4 | 40 | 0.25 | Immediate | 45 | 1.71 | 1.4 | 96.5 | Beady to filamentous. | 93.7 |
| 5 | 40 | 0.50 | ___do___ | 45 | 1.20 | 1.7 | 95.7 | Brick red, grainy. | 93.7 |
| 6 | 40 | 0.75 | ___do___ | 50 | 0.80 | 1.87 | 95.3 | ___do___ | 90.8 |
| 7 | 65 | 0.25 | ___do___ | 60 | 1.58 | 1.02 | 97.5 | Beady | 92.9 |
| 8 | 65 | 0.50 | ___do___ | 60 | 1.09 | 1.77 | 97.3 | Brick red, grainy. | 94.0 |
| 9 | 65 | 0.75 | ___do___ | 60 | 0.71 | 3.22 | 95.1 | ___do___ | 95.6 |

(b) The head liquor was contaminated with phosphate as in (a) above, heated to 80° C. and acidified to the point where the solution effected blue coloration of Congo red paper. An additional 0.5 g. $H_2SO_4$ per gram $V_2O_5$ charged was added over a period of about three minutes, and the temperature raised throughout the reagent addition so that the solution was at the boiling point shortly after all the acid had been added. A small amount of chlorate was added to insure complete oxidation of vanadium to the quinquevalent state. Some precipitation of vanadium oxide product was almost immediately evident, but rapid precipitation did not ensue for about 4-6 minutes, at which time the typical grainy red brown product began to form rapidly. The deep red solution became pale in color as the precipitation progressed, and the vanadium oxide product was filtered and washed after 1.5 hours' digestion time. The vanadium oxide product was red-brown, grainy, and easily filtered.

(c) The procedure of (b) above was repeated except that the excess acid added amounted to 0.75 g. $H_2SO_4$ per gram contained $V_2O_5$. Rapid precipitation ensued within two minutes after the excess acid was added, and the digestion was terminated in 80 minutes. The grainy vanadium oxide product filtered and washed with ease.

(d) The procedure of (b) above was repeated except that the excess acid added amounted to 1.0 g. $H_2SO_4$ per gram of contained $V_2O_5$. Rapid precipitation began within 30 seconds after the acid was added; the digestion period was prolonged for one hour. The brick red grainy vanadium oxide product was filtered and washed with ease.

Further data for each run are tabulated below in Table III.

*Table III*

| Run No | Barrens | | Product assay,* percent | | | |
|---|---|---|---|---|---|---|
| | pH | Assay ($V_2O_5$), g./l. | $V_2O_5$ | P | Na | Recovery |
| a | 3.55 | 23.3 | 88.5 | .094 | 6.9 | 22 |
| b | 1.05 | 1.17 | 94.6 | .02 | 3.25 | 96 |
| c | 0.89 | 1.54 | 93.0 | .02 | 3.00 | 95 |
| d | 0.65 | 2.55 | 93.2 | .02 | 2.75 | 91.5 |

*Commercial $V_2O_5$ must meet the following specifications:
$V_2O_5$—85% min.
P—0.5% max. (0.115% $P_2O_5$).

EXAMPLE IV

The precipitation of vanadium oxide products described in this example illustrate the effect of increasing phosphate concentration on the course of the precipitation process of this invention. The results are summarized in Table IV.

(a) A vanadium pregnant liquor identical with those used in Example III was doped to 2.0 g./liter (expressed as $P_2O_5$) with $KH_2PO_4$ to give a liquor having a $V_2O_5:P_2O_5$ ratio of only 15:1. The charge was heated to 80° C., acidified with 1:1 $H_2SO_4$ to Congo red and an additional quantity of acid equal to 1.0 g. $H_2SO_4$ per gram $V_2O_5$ charged was added in a three-minute period along with a small amount of sodium chlorate. Heating was continued throughout the reagent addition so that the solution was boiling shortly after all the acid had been added. The solution at this point was an opaque red color (typical of the purpureo vanadato phosphates). Within four minutes some vanadium oxide product had formed. The course of this precipitation ran essentially like that of Example III (b)—not a very rapid precipitation, but satisfactory. The vanadium oxide product was filtered after a precipitation time of 64 minutes.

(b) To examine the effect of high phosphate concentration but at more favorable $V_2O_5:P_2O_5$ ratios, a vanadium liquor was prepared containing 60 g. $V_2O_5$, 2 g. $P_2O_5$ (ratio 30:1) and 55 g. NaCl per liter. This precipitation was carried out as in (a) above except that 0.8 g. $H_2SO_4$ was added per g. $V_2O_5$ after initially acidifying to the Congo red point. The rate of precipitation again was essentially as in the portion (a) above. The vanadium oxide product was filtered after a precipitation time of 60 minutes.

*Table IV*

| Run No. | Barrens | | Product | | | | |
|---|---|---|---|---|---|---|---|
| | pH | Assay ($V_2O_5$), g./l. | Description | $V_2O_5$, percent | P, percent | Na, percent | Recovery, percent |
| a | 0.65 | 2.48 | Grainy | 94.3 | .041 | 2.90 | 91.7 |
| b | 0.53 | 3.7 | do | 93.8 | .028 | 2.00 | 93.8 |

Run (e) above remarkably demonstrates that at the lower pH levels of precipitation very high grade vanadium oxide products still meeting phosporus specifications can be obtained from liquors wherein the $V_2O_5:P_2O_5$ ratios are as low as 15:1; however, the limit of phosphate tolerance is beginning to be approached.

The results of run (b) above illustrate (when compared with that of run (a) and of run (d), of Example III) that although the absolute phosphate concentration has some role in determining the phosphate contamination of the vanadium oxide product, the $V_2O_5:P_2O_5$ ratio is somewhat more important in this capacity. Again better phosphate and sodium decontamination were achieved at the lower pH levels.

EXAMPLE V

A vanadium pregnant liquor was prepared by leaching a crude iron vanadate concentrate (assay about 45% $V_2O_5$) with soda ash solution at elevated temperatures, and separating the hydrated iron oxide from the solution. A charge of 6500 gallons of the pregnant solution assaying about 30 g. $V_2O_5$ per liter was heated while concentrated sulfuric acid was being added to bring the pH to about 3.3. For reasons not adequately established, no red cake was obtainable from this charge during a one-half hour digestion period at 88° C. Only a small amount of black flocculent material was formed. About 2.5 lbs. of sodium chlorate was added to insure presence of an excess of oxidant.

To precipitate the vanadium contents of the charge, concentrated sulfuric acid was fed into a pipe T where it mixed with an excess of cold water before proceeding rapidly to the heated tank of vanadium liquor. In this manner, sixty gallons (about 700 lbs.) of sulfuric acid was dumped into the tank in six minutes. The pH dropped to 1.3 and precipitation began immediately. The charge was agitated with continued steam sparging for forty-five minutes during which time the red brown grainy vanadium oxide product continued to form. The vanadium oxide product was filtered and thoroughly washed. The barrens solution had $pH_{22°}$ of 1.12 and assayed 1.8 g. $V_2O_5$/liter. The vanadium oxide product (dried at 140° C.) assayed 93.4% $V_2O_5$ and 2.88% sodium.

EXAMPLE VI

This example illustrates the processing of acid reduced vanadium liquors. These acid liquors were typical solvent extraction "strip" liquors prepared as follows:

An acid leach liquor from which the uranium had been stripped by conventional means such as ion exchange or solvent extraction, was contacted with a dialkyl phosphoric acid ester in a high flash point kerosene to effect extraction of the vanadium (quadrivalent) into the organic phase, from which it was stripped by contacting with dilute sulfuric acid (about 10–15% $H_2SO_4$, typically). Such strip liquors, depending upon the phase ratios and concentration of reagents, contain from about ten to as high as 100 g. vanadium per liter (expressed as $V_2O_5$). Practical considerations dictate preparation of liquors assaying about 25–40 grams per liter and which will ordinarily contain .05–1 gram $P_2O_5$; 1–3 g. iron and lesser amounts of aluminum per liter. The pH of these liquors is about 0.2 or less, and oxidation does not lead to appreciable precipitation of the vanadium product. It is essentially impossible to produce from these solutions a red cake satisfactory either as to grade, specifications, or even in degree of precipitation largely because of the phosphate which is present.

Inasmuch as oxidation and hydrolytic precipitation of the liquors leads to the production of additional acid, it is possible to calculate and make use of the acid produced in this manner to effect the final pH change, or one may merely monitor the pH and make adjustments as necessary to bring the pH level within the range of about 0.5–1.5.

Table V below describes conditions employed in precipitating vanadium oxide product from a variety of acid strip liquors and summarizes the results. Operation at lower pH levels was chosen to minimize contamination by iron and phosphate. The high level "barrens" are reduced and recycled to the extraction step since the degree of recovery achieved in precipitation at lower pH levels is not as high as desirable in a process wherein the barrens are discarded. In the description of the process steps, all reagent quantities are given as pounds of reagent per pound of vanadium (as $V_2O_5$) charged to the precipitation.

Runs 1 through 7 were carried out on liquors assaying 28.4 g. $V_2O_5$, 0.8 g. Fe, and .034 g. $P_2O_5$ per liter. The pH was 0.1 and the E.M.F. was about −450 mv.

Run 8 was with a liquor assaying 13 g. $V_2O_5$/liter with contaminant levels similar to the liquors of runs 1–7. Run 9 involved liquors assaying 30 g. $V_2O_5$, 200 mg. $P_2O_5$, and 1 g. Fe per liter. Other satisfactory precipitations have been carried out on liquors of $V_2O_5$:Fe ratios of 8 to 1.

What is claimed is:

1. A process for the preparation of a vanadium oxide product from an alkaline liquor containing dissolved vanadium values and dissolved phosphorus values as a contaminating impurity comprising precipitating the vanadium oxide product from the liquor at a pH of about 0.5–1.7 and a temperature between about 60° C. and the boiling point of the liquor, the pH of the liquor being adjusted by addition of an acidic substance to provide a pH of about 0.5–1.7, the pH of the liquor being adjusted rapidly and in the matter of not more than a few minutes when passing through the pH range of about 3½ to below 2 to thereby inhibit the precipitation of red cake, the vanadium values being substantially all in the quinquevalent state during precipitation of the vanadium oxide product and the foregoing pH limits being based upon the pH value of the liquor at a temperature of 25° C.

2. A process of the preparation of a vandium oxide product from an alkaline liquor containing dissolved vanadium values and dissolved phosphorus values as a contaminating impurity comprising precipitating the vanadium oxide product from the liquor at a pH between about 0.5 and less than 1.0 and a temperature between about 60° C. and the boiling point of the liquor, the pH of the liquor being adjusted by addition of an acidic substance to provide a pH between about 0.5 and less than 1.0, the pH of the liquor being adjusted rapidly and in the matter of not more than a few minutes when passing through the pH range of about 3½ to below 2 to thereby inhibit the precipitation of red cake, the vanadium values being substantially all in the quinquevalent state during precipitation of the vanadium oxide product and the foregoing pH limits being based upon the pH value of the liquor at a temperature of 25° C.

3. A process for the preparation of a vanadium oxide product from an alkaline liquor containing dissolved vanadium values comprising precipitating the vanadium oxide product from the liquor at a pH of about 0.5–1.7 and a temperature between about 60° C. and the boiling point of the liquor, the pH of the liquor being adjusted by addition of an acidic substance to provide a pH of about 0.5–1.7, the pH of the liquor being adjusted rapidly and in the matter of not more than a few minutes when passing through the pH range of about 3½ to

*Table V*

[PRECIPITATION OF VANADIUM FROM ACID REDUCED LIQUORS]

| Run No. | Process steps [1] | Barrens | | Product [2] | | | |
|---|---|---|---|---|---|---|---|
| | | $V_2O_5$ assay, g./l. | pH | Physical form | $V_2O_5$ | $P_2O_5$ | $SO_4$ |
| 1 | Heat to 60°, oxidize with 0.2 lb. $NaClO_3$, digest 15 min.; heat to 90°; neutralize slowly with 0.5 lb. $NH_3$. Digest 90° one hr. Filter and wash. | 4.03 | 0.65 | Flocculent | 92.4 | .02 | nil |
| 2 | Neutralize to pH 1.6 (40°) with 0.5 lb. $NH_3$; oxidize at 60° with 0.23 lb. chlorate. Heat to 90° and digest one hr. | 3.27 | 0.85 | Grainy | 93.0 | .01 | nil |
| 3 | Heat to 90°, oxidize with 0.2 lb. $NaClO_3$. Neutralize rapidly with 0.2 lb. $NH_3$ then with additional 0.3 lb. $NH_3$ over 15 min. Digest 40 min. | 3.54 | 0.70 | Dense, grainy | 93.6 | .02 | nil |
| 4 | Neutralize cold with 0.5 lb. $NH_3$. Heat to 90° and add 0.2 lb. $NaClO_3$ over ¼ hr. Digest 1 hr. at 90°. | 3.42 | | Fluffy | 91.7 | .04 | |
| 5 | Neutralize with 0.25 lb. $NH_3$. Oxidize 40 min. at 55° C. with 0.25 lb. $NaClO_3$. Heat to 90° and neutralize with additional 0.4 lb. $NH_3$ over 10 min. Digest 1 hr. | 2.04 | 1.02 | Mixed yellow slimes and brown beads. | 91.3 | .03 | nil |
| 6 | Heat to 60°. Oxidize with 0.2 lb. $NaClO_3$. Neutralize with 0.25 lb. $NH_3$. Heat to 90°; digest 15 min. Neutralize with 0.4 lb. $NH_3$ over 10 min. (to pH 40°=1.75) and digest 1 hr. | 2.42 | 1.05 | Dark brown, grainy | 89.6 | .03 | nil |
| 7 | Neutralize to pH 1.5–1.6 (40° C.); heat to 90° and add 0.2 lb. $NaClO_3$; digest 45 min. | 2.81 | 0.8 | Medium density, grainy | 89.5 | .02 | .07 |
| 8 | Repeat of 7 with liquors assay 13 g. $V_2O_5$/liter. | 3.6 | | do | 92.3 | .06 | .23 |
| 9 | Repeat of 7 on liquors 30 g. $V_2O_5$, 0.2 g. $P_2O_5$ and 1 g. Fe/liter. | 3.7 | 0.68 | do | 93.0 | .03 | nil |

[1] Temperatures in degrees centigrade.
[2] Specifications: $V_2O_5$, 86% min.; $P_2O_5$, 0.115% max.; $SO_4$, 0.45% max.

below 2 to thereby inhibit the precipitation of red cake, the liquor containing dissolved phosphorus values as a contaminating impurity and the $V_2O_5$ to $P_2O_5$ ratio of the liquor being greater than 15:1, the vanadium values being substantially all in the quinquevalent state during precipitation of the vanadium oxide product and the foregoing pH limits being based upon the pH value of the liquor at a temperature of 25° C.

4. A process for the preparation of a vanadium oxide product from an alkaline liquor containing dissolved vanadium values comprising precipitating the vanadium oxide product from the liquor at a pH of about 0.5–1.7 and a temperature between about 60° C. and the boiling point of the liquor, the pH of the liquor being adjusted by addition of an acidic substance to provide a pH of about 0.5–1.7, the pH of the liquor being adjusted rapidly and in the matter of not more than a few minutes when passing through the pH range of about 3½ to below 2 to thereby inhibit the precipitation of red cake, the liquor containing dissolved phosphorus values as a contaminating impurity and the $V_2O_5$ to $P_2O_5$ ratio of the liquor being greater than 15:1 and substantially less than 100:1, the vanadium values being substantially all in the quinquevalent state during precipitation of the vanadium oxide product and the foregoing pH limits being based upon the pH value of the liquor at a temperature of 25° C.

5. A process for the preparation of a vanadium oxide product from an alkaline liquor containing dissolved vanadium values comprising precipitating the vanadium oxide product from the liquor at a pH between about 0.5 and less than 1.0 and a temperature between about 60° C. and the boiling point of the liquor, the pH of the liquor being adjusted by addition of an acidic substance to provide a pH of between about 0.5 and less than 1.0, the pH of the liquor being adjusted rapidly and in the matter of not more than a few minutes when passing through the pH range of about 3½ to below 2 to thereby inhibit the precipitation of red cake, the liquor containing dissolved phosphorus values as a contaminating impurity and the $V_2O_5$ to $P_2O_5$ ratio of the liquor being greater than 15:1 and substantially less than 100:1, the vanadium values being substantially all in the quiniquevalent state during precipitation of the vanadium oxide product and the foregoing pH limits being based upon the pH value of the liquor at a temperature of 25° C.

6. A process for the preparation of a vanadium oxide product from an alkaline liquor containing dissolved vanadium values comprising rapidly initiating the precipitation of vanadium oxide product from the liquor in the matter of not more than a few minutes at a pH of about 0.5–1.7 and a temperature between about 75° C. and the boiling point of the liquor and maintaining said pH of 0.5–1.7 during precipitation of the vanadium oxide product, the pH of the alkaline liquor being adjusted by addition of an acidic substance to provide a pH of about 0.5–1.7, the pH of the liquor being adjusted rapidly in the matter of not more than a few minutes when passing through the pH range of about 3½ to below 2 to thereby inhibit the precipitation of red cake, the dissolved vanadium values being substantially all in the quinquevalent state and the liquor from which the vanadium oxide product is to be prepared containing phosphorus and dissolved metal values selected from the group consisting of iron values, sodium values and aluminum values as contaminating impurities, the solution from which the vanadium oxide product is to be prepared containing at least 0.8 gram per liter of dissolved metal values selected from the group consisting of iron values, sodium values and aluminum values, the $V_2O_5$ to $P_2O_5$ ratio of the solution from which the vanadium oxide product is to be prepared being greater than about 15:1 and substantially less than 100:1 and the precipitated vanadium oxide product containing a maximum of 0.115% $P_2O_5$.

7. A process for the preparation of a vanadium oxide product from an alkaline liquor containing dissolved vanadium values comprising rapidly initiating the precipitation of vanadium oxide product from the liquor in the matter of not more than a few minutes at a pH of about 0.5–1.0 and a temperature between about 75° C. and the boiling point of the liquor and maintaining said pH of 0.5–1.0 during the precipitation of the vanadium oxide product, the pH of the alkaline liquor being adjusted by addition of an acidic substance to provide a pH of about 0.5–1.0, the pH of the liquor being adjusted rapidly and in the matter of not more than a few minutes when passing through the pH range of about 3½ to below 2 to thereby inhibit the precipitation of red cake, the dissolved vanadium values being substantially all in the quinquevalent state and the liquor from which the vanadium oxide product is to be prepared containing phosphorus and dissolved metal values selected from the group consisting of iron values, sodium values and aluminum values as contaminating impurities, the liquor from which the vanadium oxide product is to be prepared containing at least 0.8 gram per liter of dissolved metal values selected from the group consisting of iron values, sodium values and aluminum values, the $V_2O_5$ to $P_2O_5$ ratio of the liquor from which the vanadium oxide product is to be prepared being greater than about 15:1 and substantially less than 100:1 and the precipitated vanadium oxide product containing a maximum of 0.115% $P_2O_5$.

8. A process for the preparation of a vanadium oxide product comprising adjusting the pH of an alkaline liquor containing dissolved vanadium values by addition of an acidic substance to provide a pH value between about 0.5 and 1.7, the pH of the liquor being adjusted rapidly and in the matter of not more than a few minutes when passing through the pH range of about 3½ to below 2 to thereby inhibit the precipitation of red cake, the liquor from which the vanadium oxide product is to be prepared containing phosphorus and dissolved metal values selected from the group consisting of iron values, sodium values and aluminum values as contaminating impurities and having a $V_2O_5$ to $P_2O_5$ ratio greater than about 15:1 and substantially less than 100:1, the liquor from which the vanadium oxide product is to be prepared containing at least 0.8 gram per liter of dissolved metal values selected from the group consisting of iron values, sodium values and aluminum values, oxidizing any dissolved vanadium values of the liquor having a valence less than plus 5 to the quinquevalent state, heating the liquor to a temperature between about 75° C. and the boiling point, the precipitation of vanadium oxide product being rapidly initiated in the matter of not more than a few minutes by the foregoing step of pH adjustment and such step being performed subsequent to the heating step, and maintaining the pH, vanadium oxidation state and temperature within the defined limits while precipitating the vanadium oxide product, the precipitated vanadium oxide product containing a maximum of 0.115% $P_2O_5$ and being readily filterable.

9. A process for the preparation of a vanadium oxide product comprising adjusting the pH of an alkaline liquor containing dissolved vanadium values to a value between about 0.5 and 1.0 by addition of an acidic substance, the pH of the liquor being adjusted rapidly and in the matter of not more than a few minutes when passing through the pH range of about 3½ to below 2 to thereby inhibit the precipitation of red cake, the liquor from which the vanadium oxide product is to be prepared containing phosphorus and dissolved metal values selected from the group consisting of iron values, sodium values and aluminum values as contaminating impurities and having a $V_2O_5$ to $P_2O_5$ ratio greater than about 15:1 and substantially less than 100:1, the liquor from which the vanadium oxide product is to be prepared containing at least 0.8 gram per liter of dissolved metal values selected from the group consisting of iron values, sodium values and aluminum values, oxidizing any dissolved vanadium values of the liquor having a valence less than plus 5 to the quinquevalent state, heating the liquor to a temperature between about 75° C. and the boiling point, the precipitation of vanadium oxide product being rapidly initiated in the matter of not more than a few minutes by the foregoing step of pH adjustment and such step being performed subsequent to the heating step, and maintaining the pH, vanadium oxidation state and temperature within the defined limits while precipitating the vanadium oxide product, the precipitated vanadium oxide product containing a maximum of 0.115% $P_2O_5$ and being readily filterable.

10. A process for the preparation of a vanadium oxide product comprising heating an alkaline liquor containing dissolved vanadium values in the quinquevalent state to a temperature between about 75° C. and the boiling point, the liquor from which the vanadium oxide product is to be prepared containing phosphorus and dissolved metal values selected from the group consisting of iron values, sodium values and aluminum values as contaminating impurities and having a $V_2O_5$ to $P_2O_5$ ratio greater than about 15:1 and substantially less than 100:1, the liquor from which the vanadium oxide product is to be prepared containing at least 0.8 gram per liter of dissolved metal values selected from the group consisting of iron values, sodium values and aluminum values, adjusting the pH of the heated liquor to a value between about 0.5 and 1.7 by addition of an acidic substance to thereby initiate precipitation of vanadium oxide product, the adjustment of pH within the range of about 3.5 to 1.7 being effected rapidly and in the matter of not more than a few minutes, and maintaining the pH, vanadium oxidation state and temperature within the above defined limits while precipitating vanadium oxide product, the precipitated vanadium oxide product containing a maximum of 0.115% $P_2O_5$ and being readily filterable.

11. A process for the preparation of a vanadium oxide product comprising heating an alkaline liquor containing dissolved vanadium values in the quinquevalent state to a temperature between about 75° C. and the boiling point, the liquor from which the vanadium oxide product is to be prepared containing phosphorus and dissolved metal values selected from the group consisting of iron values, sodium values and aluminum values as contaminating impurities and having a $V_2O_5$ to $P_2O_5$ ratio greater than about 15:1 and substantially less than 100:1, the liquor from which the vanadium oxide product is to be prepared containing at least 0.8 gram per liter of dissolved metal values selected from the group consisting of iron values, sodium values and aluminum values, adjusting the pH of the heated liquor to a value between about 0.5 and 1.0 by addition of an acidic substance to thereby initiate precipitation of vanadium oxide product, the adjustment of pH within the range of about 3.5 to 1.7 being effected rapidly and in the matter of not more than a few minutes, and maintaining the pH, vanadium oxidation state and temperature within the above defined limits while precipitating vanadium oxide product, the precipitated vanadium oxide product containing a maximum of 0.115% $P_2O_5$ and being readily filterable.

12. A process for the preparation of a vanadium oxide product comprising heating an alkaline liquor containing dissolved vanadium values in the quinquevalent state to a temperature between about 75° C. and the boiling point, the liquor from which the vanadium oxide product is to be prepared containing at least 10 grams per liter of $V_2O_5$, phosphorus and dissolved metal values selected from the group consisting of iron values, sodium values and aluminum values as contaminating impurities and having a $V_2O_5$ to $P_2O_5$ ratio greater than about 30:1 and substantially less than 100:1, the liquor from which the vanadium oxide product is to be prepared containing at least 0.8 gram per liter of dissolved metal values selected from the group consisting of iron values, sodium values and aluminum values, adjusting the pH of the heated liquor to a value between about 0.5 and 1.0 by addition of an acidic substance to thereby initiate precipitation of vanadium oxide product, the adjustment of pH within the range of about 3.5 to 1.7 being effected rapidly and in the matter of not more than a few minutes, and maintaining the pH, vanadium oxidation state and temperature within the above defined limits while precipitating vanadium oxide product, the precipitated vanadium oxide product containing a maximum of 0.115% $P_2O_5$ and being readily filterable.

References Cited by the Examiner

UNITED STATES PATENTS

| | | | |
|---|---|---|---|
| 1,596,483 | 8/26 | Frick | 23—19.1 |
| 2,479,905 | 8/49 | Cole et al. | 23—140 |
| 2,551,733 | 5/51 | Dunn et al. | 23—140 |
| 2,784,075 | 3/57 | Bauerle et al. | 23—140 X |

MAURICE A. BRINDISI, *Primary Examiner.*

UNITED STATES PATENT OFFICE
CERTIFICATE OF CORRECTION

Patent No. 3,190,720  June 22, 1965

Mayer B. Goren

It is hereby certified that error appears in the above numbered patent requiring correction and that the said Letters Patent should read as corrected below.

Column 4, line 72, for "comprises" read -- comprise --; column 5, line 22, for "80%" read -- 90% --; column 11, line 56, for "P-0.5% max." read -- P-.05% max. --; column 12, line 25, for "Run (e)" read -- Run (a) --; column 14, line 18, for "of the" read -- for the --; column 15, line 51, for "temperture" read -- temperature --.

Signed and sealed this 3rd day of May 1966.

(SEAL)
Attest:

ERNEST W. SWIDER
Attesting Officer

EDWARD J. BRENNER
Commissioner of Patents